June 29, 1926.
C. C. CADDEN ET AL
1,590,282
WINDING FORM FOR RADIO APPARATUS
Filed Nov. 20, 1922
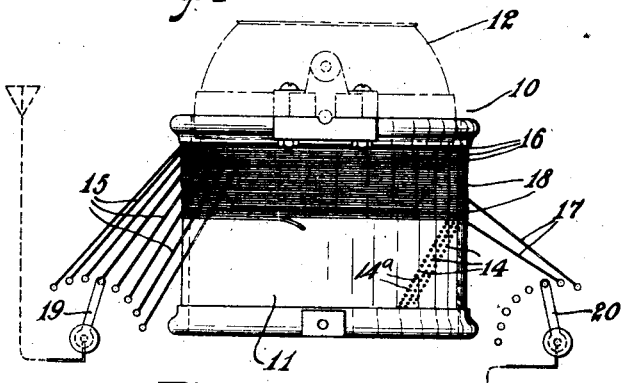
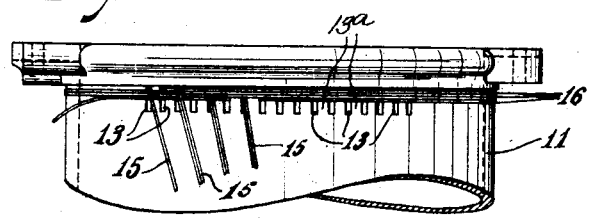
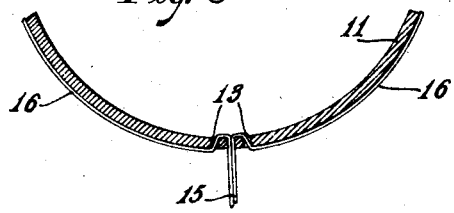
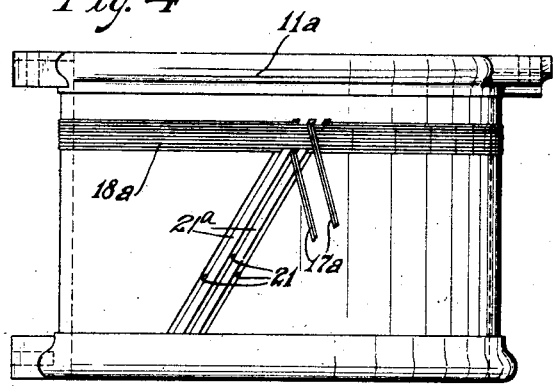
Inventors
Charles C. Cadden.
Harry Dewhirst.
By Robert M. Pierson
Atty.

Patented June 29, 1926.

1,590,282

UNITED STATES PATENT OFFICE.

CHARLES C. CADDEN AND HARRY DEWHIRST, OF AKRON, OHIO, ASSIGNORS TO THE B. F. GOODRICH COMPANY, OF NEW YORK, N. Y., A CORPORATION OF NEW YORK.

WINDING FORM FOR RADIO APPARATUS.

Application filed November 20, 1922. Serial No. 602,023.

This invention relates generally to winding-forms for radio apparatus, such as the stator unit of a variocoupler, which comprises a hollow, cylindrical structure, usually of dielectric material having thereon a wire winding from which taps are taken at desired intervals in order that the inductance may be varied by connecting with one or another of the taps, and the antennæ circuit thus tuned for a particular wave length.

In bringing taps from the stator windings the wire is commonly anchored adjacent the tap, by passing it in and out of adjacent apertures through the wall of the form, and such apertures, so far as I am aware, heretofore have been made during the winding of the form, and at the points required for that particular winding. Experimenters and amateurs, particularly when their tools are inadequate, often experience difficulty in obtaining neat and accurate results where the material to be perforated is hard and brittle as in the case of hard rubber, and inconvenience results from interrupting the winding operation to make the perforations.

The chief objects of our invention are to provide a winding form which will permit the taps to be brought out at optional points, and which may be wound with any size of wire, without requiring to be perforated during the winding thereof.

Of the accompanying drawings:

Fig. 1 is a side elevation of a preferred embodiment of our winding form and associated elements.

Fig. 2 is a fragmentary side elevation, on a larger scale, of the form and part of the winding thereon.

Fig. 3 is a transverse section of the wound form.

Fig. 4 is a side elevation of a modified form of our invention.

Referring to the drawings, 10 represents generally a variocoupler such as is used in the antennæ circuit of a radio receiving set, said variocoupler comprising a stator member 11 in the form of a hollow cylinder of molded dielectric material, and a rotor member 12 which is so mounted as to be rotatable within the field of said stator member.

The stator member or winding form 11, near one of its ends, is formed on one side with a circumferentially spaced series of short slots 13, 13, alternating with bridge-portions 13ª, 13ª. The side of the form opposite the slots 13 is provided with three parallel, obliquely or helically disposed rows of closely spaced apertures 14, 14 corresponding perforations of the three rows being aligned in planes perpendicular to the axis of the form and separated by bridge portions 14ª, 14ª.

The bridge-portions 13ª between the slots 13 afford anchorage for tap loops 15, 15 taken off from the winding at intervals of one turn; these single turns being designated 16, 16, and the method of anchoring the wire where the tap is taken off being clearly shown in Fig. 3. In like manner the bridge-portions 14ª between the apertures 14 afford anchorage for tap loops 17, 17 taken off, throughout the remainder of the axial length of the winding, at intervals of several turns; the plurality of turns between taps being shown at 18, 18. The apertures 14 are so closely spaced, lengthwise of the form, that after any desired number of turns one transverse set of such perforations will always be found in sufficiently accurate position for taking off the tap loop, even though wire of different diameter be used with the same size and type of form.

The tap loops 15, which as here shown are parts of the single wire of the winding, are attached to respective poles of a multiple point switch 19, and likewise the tap loops 17, from the larger divisions, 18, of the winding are integral with the wire of the winding and are attached to respective poles of a multiple switch 20. In practice there are preferably as many single-turn divisions, 16, as there are turns in each of the larger divisions, 18, so that by the manipulation of the switches 19 and 20 it is possible to combine any number of wire turns in the circuit and thus to obtain the inductance desired, and such type of winding may readily be had with our improved winding form.

In the modification shown in Fig. 4 a modified winding form 11ª is provided with three obliquely or helically disposed, parallel, elongated apertures or slots 21, 21 instead of the apertures 14 of Fig. 1, said slots being separated by bridge-portions 21ª, 21ª providing anchorage for the wire where tap loops 17ª, 17ª are taken off between the multiple-turn divisions of the winding.

While the oblique arrangement of the apertures 14 or 21, and a multiplicity of circumferentially spaced slots 13, are preferred, because they permit the taking off of the taps at circumferentially spaced points so that they are not too close together for convenient manipulation, we do not wholly limit our claims to such oblique arrangement of the apertures.

Further modification may be resorted to without departing from the scope of our invention, and we do not wholly limit our claims to the specific construction shown herein.

We claim

1. A winding form for electrical apparatus, said form having an annular winding surface interrupted by apertures closely spaced apart circumferentially of said surface and defined by a pair of closely adjacent bridge-portions of the form adapted to retain the base portions of taps formed by threading the wire through said apertures and drawing out a loop of the wire between said bridge-portions, said apertures being so disposed on said form as to provide anchorage for taps taken at minutely variable intervals axially of said form.

2. A winding form for electrical apparatus, said form comprising a molded hollow structure having an annular winding surface and formed with apertures through its wall closely spaced apart circumferentially of said surface, said apertures being defined by a pair of closely adjacent bridge portions of the form, and said apertures being so disposed on said form as to permit interlacing of the winding therein at minutely variable positions axially of the form.

3. A winding form for electrical apparatus, said form comprising a hollow structure having an annular winding surface and formed with slots through its wall closely spaced apart circumferentially of said surface and disposed transversely thereof, said slots providing at least a pair of intervening, closely adjacent bridge-portions of the form adapted to provide anchorage for taps taken off from the winding by threading the wire through said slots and drawing out a loop of the wire between said bridge-portions.

4. A winding form for electrical apparatus, said form comprising a hollow structure having a circumferentially spaced series of apertures through its wall at one end of its winding surface, adapted to receive in threaded relation the wire of a winding thereon, and at another part of its winding surface being formed with three oblique rows of closely spaced apertures through its wall.

In witness whereof we have hereunto set our hands this 16 day of November, 1922.

CHARLES C. CADDEN.
HARRY DEWHIRST.